E. G. MATTISON.
WIND SHIELD SHADE.
APPLICATION FILED DEC. 8, 1917.

1,299,986.

Patented Apr. 8, 1919.
2 SHEETS—SHEET 1.

Witnesses

Inventor
E. G. Mattison
By Victor J. Evans
Attorney

E. G. MATTISON.
WIND SHIELD SHADE.
APPLICATION FILED DEC. 8, 1917.
1,299,986.
Patented Apr. 8, 1919.
2 SHEETS—SHEET 2.
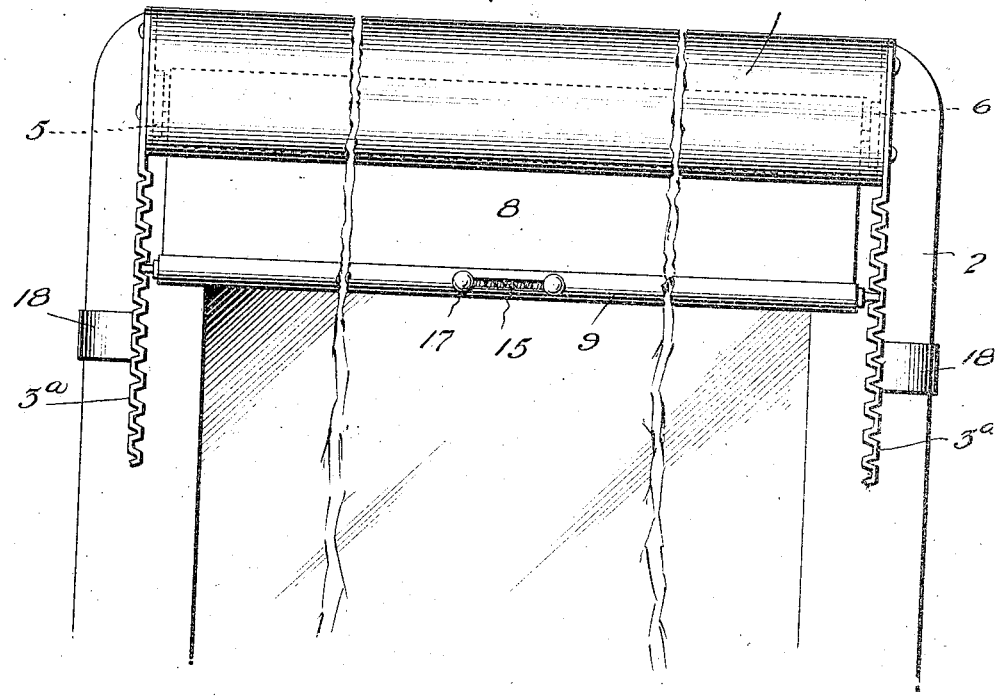
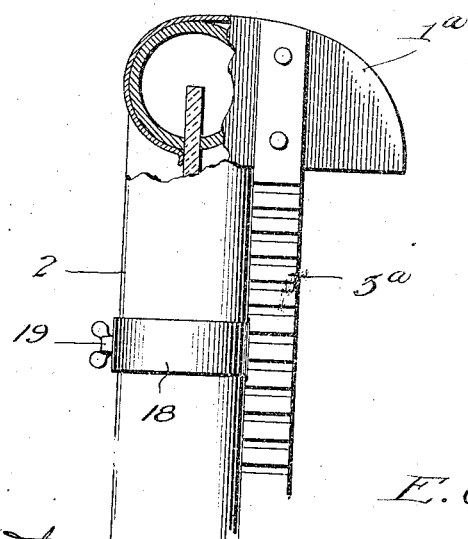
Inventor
E. G. Mattison
By Victor J. Evans
Attorney
Witnesses

UNITED STATES PATENT OFFICE.

EUGENE G. MATTISON, OF PASADENA, CALIFORNIA.

WIND-SHIELD SHADE.

1,299,986.  Specification of Letters Patent.  Patented Apr. 8, 1919.

Application filed December 8, 1917. Serial No. 206,287.

*To all whom it may concern:*

Be it known that I, EUGENE G. MATTISON, a citizen of the United States, residing at Pasadena, in the county of Los Angeles and State of California, have invented new and useful Improvements in Wind-Shield Shades, of which the following is a specification.

This invention relates to improvements in automobile wind shields and especially with reference to the provision of an adjustable shade for a wind shield, for use in protecting the eyes of the driver from sunlight and glare, the object of the invention being to provide an improved shade of this character which may be readily adjusted as desired and secured in any desired adjusted position.

The invention consists in the construction, combination and arrangement of devices hereinafter described and claimed.

In the accompanying drawings:—

Fig. 4 is an elevation of a modified form of my invention which may be used as an attachment to a wind shield.

Fig. 5 is a detailed view of the same.

Figure 1:
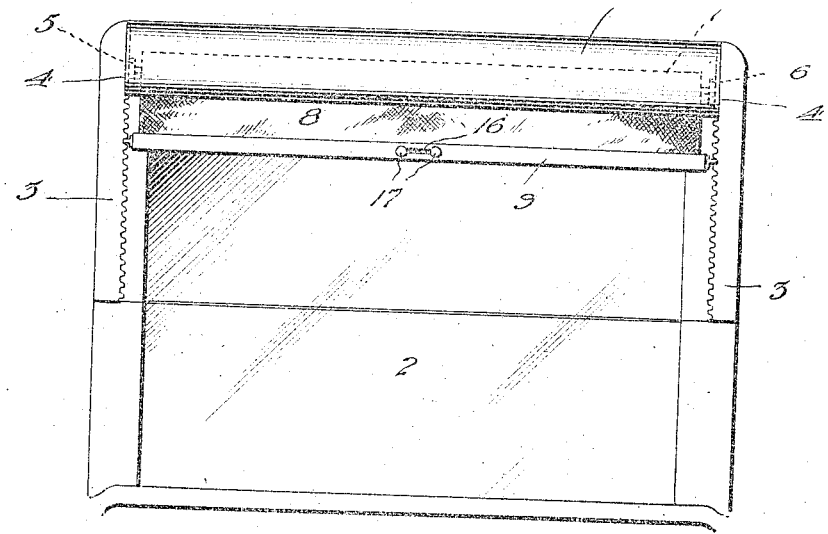
Figure 1 is an elevation of a wind shield provided with an adjustable shade constructed and arranged in accordance with my invention.
Figure 2:
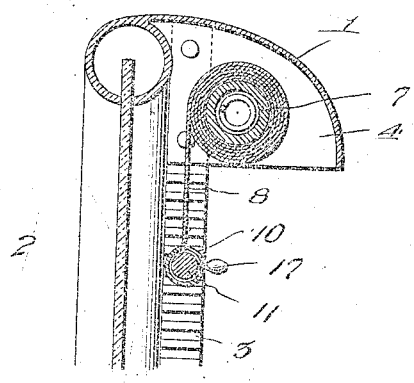
Fig. 2 is a vertical sectional view of the same.
Figure 3:
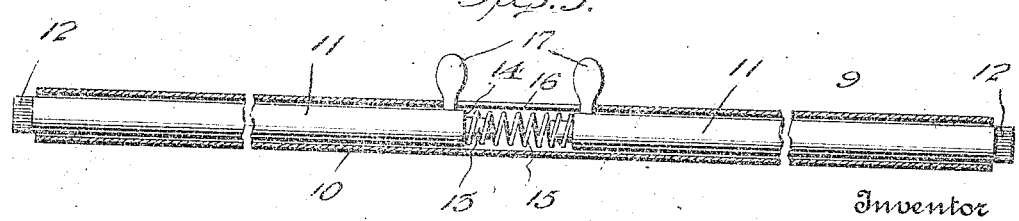
Fig. 3 is a detailed sectional view of the lower portion of the shade.

In accordance with my invention I provide a hood 1 at the upper side of the frame of a wind shield 2 and I also provide vertically arranged racks 3 at the sides of the wind shield. The ends 4 of the hood are connected to the upper ends of the racks 3 and form brackets which are provided with bearings 5, 6 for the spindles at the ends of a spring roller 7 which is thus mounted for rotation and is arranged at the upper side and extends across the wind shield.

A shade 8 of any suitable flexible material is attached at its upper side to the spring roller for winding thereon and is provided at its lower side with a bar 9. The shade bar comprises a tube 10 and a pair of longitudinally movable locking rods 11 which are arranged in the tube and the outer ends of which are provided with teeth 12 to engage the teeth of the rack bars 3 and to thereby hold the shade in any desired adjusted position. The inner ends of the rods 11 are reduced as at 13 to form shoulders 14. A coiled extensile spring 15 is arranged between the inner ends of said rods and serves to press them outwardly to hold the rods in engaged position with respect to the rack bars. The tube 10 is provided at the center with a longitudinal slot 16. Finger pieces 17 are attached to the inner portions of the rods 11 and operate in said slot and hence enable the rods to be readily disengaged from the racks when it is desired to change the adjustment of the shade or to roll up the same.

In Figs. 4 and 5 of the drawings I show a modified form of my invention which is adapted to be used as an attachment to a wind shield and which may be employed on a wind shield of any ordinary form. In this form of the invention the hood 1ª and racks 3ª are made of sheet metal. The hood is provided with a semi-tubular front portion 20 to engage over and around the front side of the top bar of the wind shield spring and the racks are provided with curved clamping arms 18 to engage around the sides of the wind shield frame and the said clamping arms are provided with set screws 19 to secure the same to the wind shield. The shade roller is mounted in bearings, as shown in the ends of the hood. This attachment can be applied to or removed from the wind shield as may be desired.

While I have herein shown and described a preferred form of my invention, I would have it understood that changes may be made in the form, proportion and construction of the several parts without departing from the spirit of my invention and within the scope of the appended claims.

Having thus described my invention, I claim:—

1. A wind shield attachment comprising a hood including a curved top wall adapted for conforming engagement upon the top bar of a windshield, a pair of depending racks secured upon said hood and extending along the side bars of the wind shield, clips carried by said racks and conformingly engaging the side bars of the wind shield, a shade carried by a roller mounted within said hood, a rod at the free end of said shade and means carried by said rod and engageable with said rack for holding said shades in selected position.

2. A shade for automobile wind shields, comprising a hood extending forwardly from the top bar of the wind shield and including a curved top wall and closed end walls, a pair of depending racks secured upon the end walls of said head and extending along the side bars of the wind shield, a shade carried by a roller mounted within said hood, a rod at the free end of said shade, and means carried by said rod and engageable with said racks for holding said shade in selected positions.

EUGENE G. MATTISON.